United States Patent
Radetzki

(10) Patent No.: US 11,434,078 B2
(45) Date of Patent: Sep. 6, 2022

(54) PIECE GOODS CABINET COMPRISING A PLURALITY OF PIECE GOODS MODULES AND METHOD FOR OPERATING SUCH A PIECE GOODS CABINET

(71) Applicant: Uwe Radetzki, Bonn (DE)

(72) Inventor: Uwe Radetzki, Bonn (DE)

(73) Assignee: Deutsche Post AG, Bonn (DE)

(*) Notice: Subject to any disclaimer, the term of this patent is extended or adjusted under 35 U.S.C. 154(b) by 33 days.

(21) Appl. No.: 17/096,486

(22) Filed: Nov. 12, 2020

(65) Prior Publication Data
US 2021/0139242 A1    May 13, 2021

(30) Foreign Application Priority Data

Nov. 12, 2019 (DE) .................... 10 2019 130 512.8

(51) Int. Cl.
*B65G 1/137* (2006.01)
(52) U.S. Cl.
CPC ................... *B65G 1/1375* (2013.01)
(58) Field of Classification Search
CPC ..................................................... B65G 1/1375
See application file for complete search history.

(56) References Cited

U.S. PATENT DOCUMENTS

| | | | | |
|---|---|---|---|---|
| 4,884,935 A | * | 12/1989 | Smith ....................... | B61B 3/00 414/572 |
| 2006/0250056 A1 | * | 11/2006 | Fitzgerald ................ | A47F 3/02 312/249.9 |
| 2008/0272565 A1 | * | 11/2008 | Fitzgerald ................ | G01G 19/02 280/47.35 |
| 2018/0290829 A1 | * | 10/2018 | Schroepf .................. | G06Q 50/28 |
| 2020/0002094 A1 | * | 1/2020 | Schedlbauer ........... | B65G 1/1375 |

FOREIGN PATENT DOCUMENTS

| | | |
|---|---|---|
| AT | 519 498 A2 | 7/2018 |
| CN | 103738640 A | 4/2014 |
| CN | 104790420 A | 7/2015 |
| CN | 109166254 A | 1/2019 |
| CN | 110065757 A | 7/2019 |
| EP | 3 521 147 A1 | 8/2019 |
| WO | WO 2015/039155 A1 | 3/2015 |
| WO | WO 2018/112490 A2 | 6/2018 |
| WO | WO 2018/112490 A3 | 10/2018 |

\* cited by examiner

*Primary Examiner* — Kyle O Logan
(74) *Attorney, Agent, or Firm* — Reinhart Boerner Van Deuren P.C.

(57) ABSTRACT

A piece goods cabinet including a plurality of piece goods modules is disclosed. Each piece goods module has a plurality of piece goods compartments. Each piece goods compartment is assigned a closure unit which is displaceable from a closed position into an open position. At least individual piece goods modules within the piece goods cabinet are arranged such that they can be displaced between at least two module positions, at least substantially in the vertical direction and/or at least substantially in at least one horizontal direction. In order that the displacement of piece goods modules of appropriate piece goods cabinets can be simplified further, provision is made for the at least individual displaceable piece goods modules to be connected to mover units of the piece goods cabinet, which are designed to displace the piece goods modules in the piece goods cabinet.

19 Claims, 6 Drawing Sheets

PIECE GOODS CABINET COMPRISING A PLURALITY OF PIECE GOODS MODULES AND METHOD FOR OPERATING SUCH A PIECE GOODS CABINET

CROSS-REFERENCE TO RELATED PATENT APPLICATION

This patent application claims the benefit of German Patent Application No. 10 2019 130 512.8, filed Nov. 12, 2019, the entire teachings and disclosure of which are incorporated herein by reference thereto.

FIELD

The invention relates to a piece goods cabinet comprising a plurality of piece goods modules, wherein each piece goods module has a plurality of piece goods compartments, wherein each piece goods compartment is assigned a closure unit which is displaceable from a closed position closing the respective piece goods compartment, preventing removal of a piece good from the piece goods compartment into an open position opening the piece goods compartment for the removal and/or insertion of a piece good and back again, wherein at least individual piece goods modules within the piece goods cabinet are arranged such that they can be displaced between at least two module positions, at least substantially in the vertical direction and/or at least substantially in at least one horizontal direction. Furthermore, the invention relates to a method for operating such a piece goods cabinet.

BACKGROUND

Piece goods cabinets are known in different configurations. Piece goods can be kept in separate piece goods compartments in the piece goods cabinets. For this purpose, the piece goods compartments typically have closure units in the form of doors or flaps, which can be displaced between a closed position and an open position. In the closed position, it is possible to ensure that unauthorised persons have no access to a piece good in the piece goods compartment. In the open position, on the other hand, authorised persons can insert piece goods into the piece goods cabinet or remove the same from the piece goods cabinet.

To ensure the operation of the piece goods cabinet by authorized persons, the piece goods cabinet can be designed to authenticate persons for certain operations. Thus, for example, the authorized persons can have a key, an ID card, a username and/or a code to authenticate themselves. Other types of access control are conceivable, however. It is also conceivable that no separate access control is carried out on the piece goods cabinet, for example, since the piece goods cabinet is already erected in a restricted-access region, to which only specific persons gain access at all.

Piece goods cabinets of the known type also have individual piece goods modules which each comprise at least one piece goods compartment. Expressed in another way, the piece goods compartments of the piece goods cabinet can each be assigned one of the piece goods modules. The subdivision of the piece goods cabinet into multiple piece goods modules can then be used to displace the piece goods modules and therefore the associated piece goods compartments within the piece goods cabinet. The piece goods modules can accordingly be displaced within the piece goods cabinet between at least two module positions; this displacement is optionally carried out in an at least substantially vertical or in at least substantially horizontal direction.

The piece goods cabinets of the known type are preferably but not necessarily so-called package stations or the like, into which piece goods, for example in the form of mailings and/or packages, can be inserted so that they can be collected later by a person authorized for the purpose. In the case of piece goods, the authorized person can be a customer or a person who has ordered the piece goods. In the case of packages, this can be the addressee of the package. However, other piece goods cabinets and/or other uses of the piece goods cabinets are also conceivable.

In order to displace the piece goods modules of known piece goods cabinets, however, a considerable outlay on apparatus and/or operating effort is required. Consequently, there is therefore the aspiration to achieve further improvements here.

BRIEF SUMMARY

The present invention is therefore based on the object of configuring and further developing the piece goods cabinet and the method of the type mentioned at the beginning and previously described in detail in each case in such a way that the displacement of piece goods modules of corresponding piece goods cabinets can be simplified further.

In a piece goods cabinet, this object is achieved in that at least individual displaceable piece goods modules are connected to mover units of the piece goods cabinet, which are designed to displace the piece goods modules in the piece goods cabinet.

The aforementioned object is also achieved by a method for operating a piece goods cabinet, in which the closure unit of at least one piece goods compartment of a piece goods module is opened, in which a piece good is either removed from the open piece goods compartment or inserted into the open piece goods compartment, in which the closure unit of the at least one piece goods compartment is closed again after the insertion, and in which, following the closure of the piece goods compartment, at least individual piece goods modules are moved by means of the mover units connected to the appropriate piece goods modules within the piece goods cabinet between at least two module positions in an at least substantially vertical and/or in an at least substantially horizontal direction in the piece goods cabinet.

To be able to implement the displacement of the piece goods modules more simply, at least individual piece goods modules are connected to mover units, which bring about the displacement of the piece goods modules in the piece goods cabinet. The connection exists in particular during the displacement of the individual piece goods modules but can also remain beyond this. The mover units permit the displacement of the piece goods modules in at least one at least substantially vertical and/or in at least one at least substantially horizontal direction.

The function of the displacement of the piece goods modules is correspondingly concentrated in the mover units. The piece goods modules themselves therefore do not also have to perform the displacement function, which overall leads to a simplification of the overall system and also the handling thereof.

For a better understanding, the piece goods cabinet and the method for the operation thereof will be described together, without a distinction always being drawn in detail between the piece goods cabinet and the method. However, on the basis of the context, it will be clear to those skilled in the art which respective feature is particularly preferred in relation to the piece goods cabinet and in relation to the method.

In a first particularly preferred refinement of the piece goods cabinet, the mover units are designed to be detachable and re-connectable to the individual piece goods modules. This makes it possible for the piece goods modules to be replaced. The piece goods modules of a piece goods cabinet therefore do not necessarily remain permanently assigned to the corresponding piece goods cabinet but, instead, can be replaced by other identical piece goods modules as necessary. This identity can relate, for example, to the connectability to the mover units and/or to the physical dimensions, so that the piece goods modules can primarily fit expediently into the piece goods cabinet and be accommodated therein. Against this background, it is therefore particularly preferable if the individual piece goods modules of the piece goods cabinet are replaceable by identical piece goods modules.

Alternatively or additionally to a replacement of individual piece goods modules, the mover units thus do not have to remain permanently connected to the corresponding piece goods modules, specifically in particular when the piece goods modules are not displaced in the piece goods cabinet. Instead, the mover units can be used one after another for displacing different piece goods modules, so that a lower number of mover units are required to displace the individual piece goods modules in the piece goods cabinet. After a piece goods module has been displaced, the mover units of said piece goods module can be connected to another piece goods module, in order then to displace this piece goods module.

A further simplification and, in addition, higher reliability can be achieved if a rail system is provided for the guided displacement of the at least individual piece goods modules. By means of the rail system, for example, the displacement paths for the piece goods modules are predetermined. In addition, the displacement of the piece goods modules can be carried out more uniformly, more gently and more reproducibly than without the rail system. Here, for reasons of simplicity, it is highly advisable for the mover units to be guided on the rail system. The rail system therefore serves to guide the piece goods modules during the displacement of the piece goods modules via the guided movement of the mover units along the rail system.

To achieve an expedient displacement for the utilization of the piece goods cabinet, the rail system can have at least substantially vertical rail sections and at least substantially horizontal rail sections. The flexibility of the rail system and its utility are increased if the vertical and the horizontal rail sections at least partly cross one another.

It is also particularly expedient if the rail system has horizontal rail sections extending at least substantially at right angles to one another for the guided displacement of the at least individual piece goods modules. Then, it is not only possible for piece goods modules to be displaced sideways in the piece goods cabinet but also to be displaced forward and backward. This not only opens up increased flexibility but also makes it easier to remove and receive piece goods modules which have to be replaced as necessary. To be able to move mover units as necessary more reliably and more expediently between two at least mutually substantial right-angled rail portions of the rail system, it may be advisable for the corresponding rail portions to have a certain curvature or rounding in the common connecting area. Thus, if necessary, inadvertent jamming of mover units during the transition from one rail portion to an adjacent rail portion oriented at least substantially at right angles to the first rail portion can be avoided. A curvature or rounding in the connecting area between at least two right-angled portions can likewise be advisable between two at least substantially horizontal and at least substantially right-angled rail portions as between an at least substantially vertical rail portion and an at least substantially horizontal rail portion.

The piece goods cabinet can be used and operated particularly expediently if the mover units are arranged to be movable automatically along the rail system. The mover units therefore do not have to be operated directly by a user. Instead, the mover units, in particular each mover unit on its own, can be moved independently in the piece goods cabinet by a suitable control system. The displaceability permits synchronous displacement of a plurality of mover units along the rail system if necessary and/or the movement of the least individual mover units independently of one another along the rail system if necessary. Thus, the mover units can be used very flexibly and particularly expediently.

So that from time to time unused mover units do not impair the displacement of piece goods modules by the movement of other mover units, at least one parking area for currently unused mover units can be provided in the rail system. From this parking area, for example, the mover units can then be moved very specifically to a piece goods module which is to be displaced next in the piece goods cabinet. Following this displacement, the mover units can then return into the parking area in the rail system.

If the mover units have a connection unit for detachable connection to at least one piece goods module, the mover units can easily and reliably be connected to the respectively desired piece goods modules, which are so desired for example because they are to be displaced. If other piece goods modules are then to be displaced, the same mover units can easily be separated from the piece goods modules and again connected to the piece goods modules that are then to be displaced. A movement unit of the mover units, on the other hand, can be useful for the specific movement of the mover units along the rail system. To bring about this movement, a drive unit, which drives the movement unit, can additionally be provided. To achieve a controlled and therefore specific movement of the mover units, these can alternatively or additionally have a control unit for controlling the mover units. So that the mover units can be moved in a manner coordinated with one another, it is expedient if required if a communications unit is provided for communication between the mover unit and a control module of the piece goods cabinet, for communication between the mover unit and a control unit of the piece goods module and/or for communication between the mover unit and control units of further mover units.

An expedient movement of the mover units can preferably be implemented, for example, by the movement unit for driving the mover units having a rotor. The rotor is then used to move the mover unit along a stator assigned to the rail system. Thus, the rotor and the stator then form a linear motor, so that an electromagnetic drive of the mover units can be provided. Alternatively or additionally, at least one drive wheel for moving the mover units can also be assigned to the latter, with which the mover units then roll along the rail system. To be able to move the mover units easily in different directions and to change the directions of travel easily, it may in particular be advisable if the at least one drive wheel is designed as an omnidirectional wheel.

So that the piece goods modules do not have to be held permanently by the mover units in the piece goods cabinet, so that, for example, the mover units can be used in other ways while a piece goods module remains in its place, locking devices for the stationary locking of piece goods modules in predetermined positions in the piece goods cabinet can be provided. The locking devices then preferably perform the stationary holding of the piece goods modules while the mover units hold the piece goods modules, in particular while the piece goods modules are displaced by the mover units. It is particularly expedient if the mover units are detached from the piece goods modules that are locked in a stationary manner by the locking devices and can also be connected to said piece goods modules again.

The piece goods modules can be used very expediently and effectively if piece goods compartments are each assigned a floor for holding a piece good in the respective piece goods compartment, and at least individual floors are provided to be displaceable between a holding position for holding a piece good in a forwarding position for forwarding the piece good into the piece goods compartment located underneath. Then, a piece good from a piece goods compartment can be forwarded to a piece goods compartment arranged underneath by opening the associated floor. Thus, for example, a piece goods module is emptied, so that it can be replaced by a piece goods module filled with further piece goods. However, a piece goods module can also be filled as a result, so that when a piece goods module is removed, more piece goods can be taken from the piece goods module with it. Thus, in particular, the replacement of piece goods modules can be configured particularly efficiently.

In a first, particularly preferred, refinement of the method, individual mover units are connected to the individual piece goods modules and separated from the individual piece goods modules again at a later time. This is then done, for example, irrespective of whether the piece goods module is to be displaced or not. The mover units can then always be used where a piece goods module is to be displaced, which makes the use of the mover units more effective and can restrict the necessary number of mover units. In addition, individual piece goods modules of the piece goods cabinet can be replaced by identical piece goods modules in the manner described, without the mover units also having to be replaced. The replacement therefore becomes simpler and also fewer mover units are needed for the purpose.

The piece goods modules can be displaced very reliably and simply if this is carried out in such a way that is at least the individual mover units for displacing the individual piece goods module are displaced and moved along a rail system. The mover units and, accordingly, also the associated mover units moved and displaced, are guided on the rail system. To be able to achieve a displacement of the piece goods modules which is flexible and highly profitable, it may be advisable if the mover units are displaced while guided as necessary on vertical rail sections and on horizontal rail sections. Thus, the piece goods modules in the piece goods cabinet can be displaced in different spatial directions. For flexible and simple displacement, it is particularly preferred if the vertical rail sections cross the horizontal rail sections at least in some sections and/or at least partly.

In order that individual piece goods modules can be displaced in a desired way and also simply by multiple mover units, it is advisable for the mover units to be able to move automatically along the rail system. It then preferably needs only appropriate control commands which move the mover units to be moved in a desired manner. For the displacement of the piece goods modules, it is preferable if the mover units can be moved at least partly synchronously and/or at least partly independently of one another along the rail system. The mover units can then be moved to a specific location in the piece goods cabinet independently of other mover units. On the other hand, multiple mover units can displace individual piece goods modules in a mutually coordinated manner. Should individual mover units not be needed, these can be displaced as necessary into a parking area of the rail system, to be specific in particular until the mover units are needed again. Arranged in the parking area, the mover units do not interfere, for example, with the displacement of other mover units and/or specific piece goods modules.

If at least individual mover units can be detachably connected to at least one piece goods module via connection units of the mover units, chronologically successive, different combinations of piece goods modules and mover units can easily be implemented. On the other hand, the mover units and therefore the piece goods modules can expediently be moved and displaced along the rail system by movement units of the mover units. The mover units can additionally be driven to move specifically and effectively via drive units of the mover units. The mover units can be activated very individually to move via control units of the mover units. So that the movement of the individual mover units is coordinated with other mover units and/or with other piece goods modules, the mover units can if necessary communicate with a control module of the piece goods cabinet, with a control unit of the piece goods module and/or with a control unit of further mover units via communication units of the mover units.

The mover units can be moved simply and accurately along the rail system by means of a rotor if the rail system is assigned a stator. The rotor of the mover units and the stator of the rail system can then specifically together form a linear motor for moving the piece goods modules, so that an electromagnetic drive of the mover units can be provided. Alternatively or additionally, the mover units can be moved along the rail system by using at least one drive wheel rolling along the rail system, in order in this way to displace the piece goods modules. So that the piece goods modules can be displaced very flexibly, the at least one drive wheel is further preferably designed as an omnidirectional wheel.

For effective utilization of the individual mover units in the piece goods cabinet, it is expedient if individual piece goods modules can be transferred from the associated, individual mover units to locking devices. The piece goods modules are preferably held in a stationary manner in the piece goods cabinet by the locking devices. For this purpose, if necessary no further mover units are required. To be able to move the piece goods modules locked in a stationary manner in the piece goods cabinet at a later time, it is expedient if individual piece goods modules are transferred from the locking devices of the piece goods cabinet by individual mover units, and can then be moved into the piece goods cabinet.

So that the piece goods modules can be utilized very efficiently, at least one piece good can be forwarded by at least one openable floor of at least one piece goods compartment into a piece goods compartment arranged underneath. Thus, for example, the lower piece goods module can be filled and the upper piece goods module emptied. The corresponding transfer of the piece goods downward through the at least one floor of the at least one piece goods compartment is, if necessary, possible not only between two adjacent piece goods modules but, alternatively or additionally, also between piece goods compartments of an individual piece goods module. If individual piece goods modules of the piece goods cabinet are replaced by identical piece goods modules, it may be effective if the piece goods module removed from the piece goods cabinet is empty and all the piece goods remain in the other piece goods modules. Then, for example, the piece goods can be collected or accepted at the appropriate piece goods cabinet. Alternatively or additionally, it may be expedient if the piece goods module removed from the piece goods cabinet is full and more empty piece goods compartments are left in the piece goods cabinet. Then, there are further piece goods compartments, into which piece goods can be inserted, in the piece goods cabinet. So that the forwarding of piece goods from one piece goods compartment to a piece goods compartment located underneath can be carried out simply and reliably, a floor of at least one piece goods compartment can be opened between a holding position for holding a piece good in a forwarding position for forwarding the piece good into the piece goods compartment located underneath and, in particular, can also be closed again.

BRIEF DESCRIPTION OF THE DRAWINGS

The invention will be explained in more detail below by using a drawing merely illustrating an exemplary embodiment, in which.

DETAILED DESCRIPTION

Figure 1A:
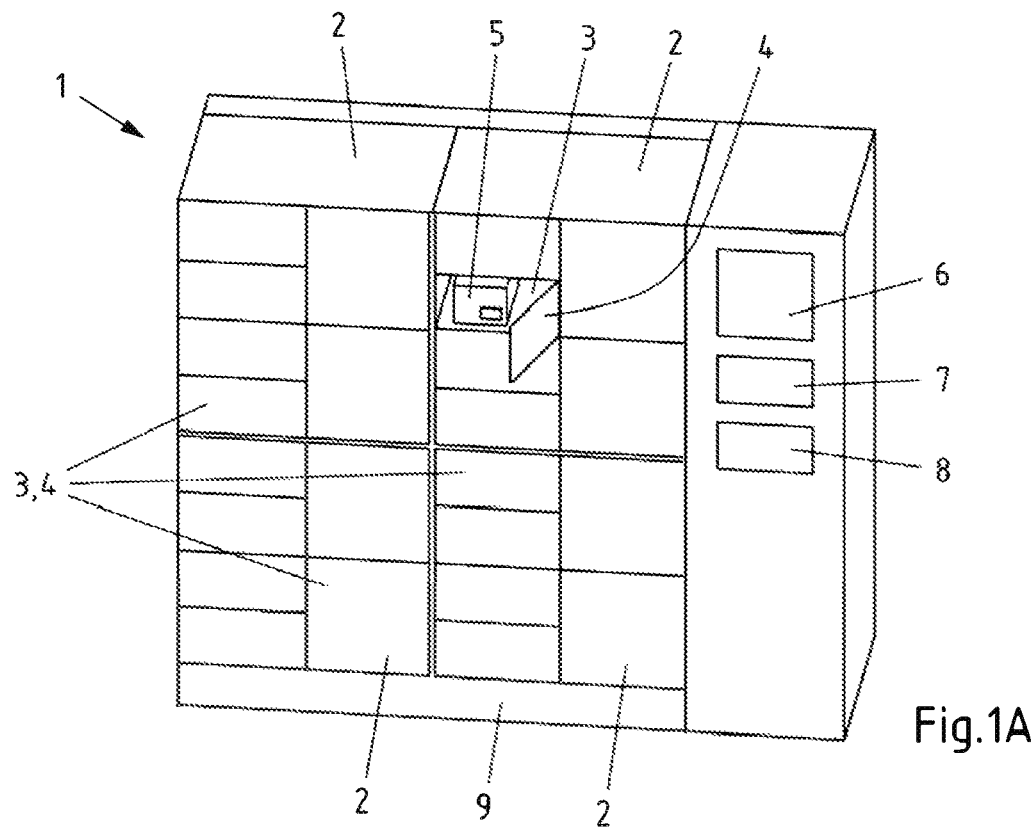
FIGS. 1A-D show a piece goods cabinet according to the invention in a schematic perspective view.

Illustrated in FIG. 1A is a piece goods cabinet 1 having four different piece goods modules 2, each of which has multiple piece goods compartments 3. Each piece goods compartment 3 comprises a closure unit 4 in the form of a flap, which can be displaced, in particular pivoted, between a closed position into an open position. In one of the piece goods compartments 3 illustrated, the closure unit 4 is illustrated in the open position, which permits an insertion of piece goods 5 and/or a removal of piece goods 5. Access to piece goods 5 in the remaining piece goods compartments 3 is reliably prevented by the closure units 4 in the closed position. In addition to the piece goods modules 2 in the piece goods cabinet 1 which is illustrated and to this extent preferred, an operating module 6, a control module 7 and a communications module 8 are also provided. Via the operating module 6, authentication of a person can be performed. For example, in the absence of the operating module 6, authentication of a person can alternatively be performed by means of the communications module 8. For this purpose, for example, the corresponding person can send authentication information to the communications module 8 by means of a smart phone or another external device, in particular a handheld device, or exchange said information with the communications module 8.

The person is then authorized to insert a piece good 5 into a piece goods compartment 3 and/or to remove a piece good 5 from a piece goods compartment 3. Accordingly, the control module 7 can open and store a specific piece goods compartment 3 which piece good 5 has been inserted or removed and/or who has inserted a piece good 5 in which piece goods compartment 3 or has removed a piece good 5 from a piece goods compartment 3. Thus, for example in the control module 7, it is recorded which piece goods compartments 3 are occupied by piece goods 5 and which piece goods compartments 3 are not occupied by piece goods 5.

The piece goods cabinet 1 illustrated is in particular but not necessarily a so-called package station, into the piece goods compartments 3 of which piece goods 5 in the form of packages or other mailings can be inserted. Then, the piece goods 5 can be inserted into the piece goods compartments 3 by a courier or the like for collection by the addressee or a person appointed by the latter. The person authorized for the collection preferably proves their authorization at the piece goods cabinet 1 or an access control to the piece goods cabinet 1. The closure unit 4 of the piece goods compartment 3 in which the piece good provided for collection by the authorized person is stored is opened by the piece goods compartment 3 or at least released to be opened. Alternatively, however, a piece good 5 for another person can also be inserted into a piece goods compartment 3. The piece good 5 is then removed from the piece goods compartment 3 by the courier or a comparable person, after said person has proved their appropriate authorization, as described previously. The person then takes the piece good 5 to the addressee, a distribution station or to another piece goods cabinet 1.

Figure 1B:
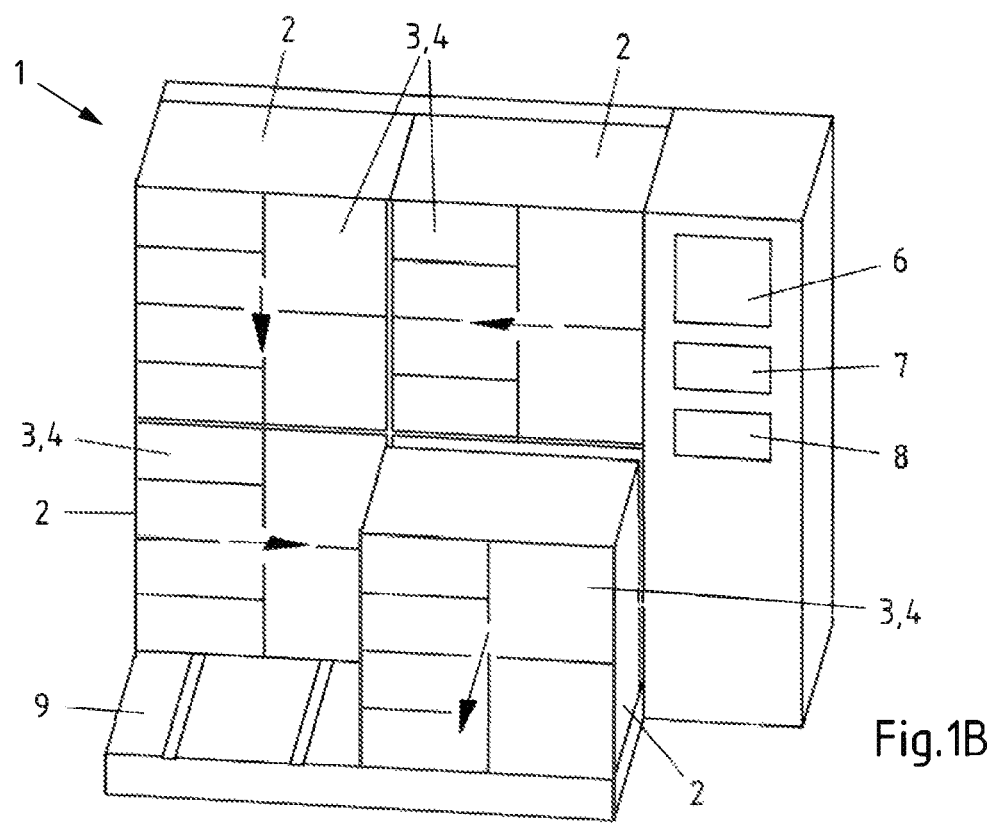

The arrangement of the piece goods modules 2 in the piece goods cabinet 1 is not permanently defined, as illustrated by way of example in FIG. 1B. Instead, the arrangement of the piece goods modules 2 can be changed. In the piece goods cabinet 1 that is illustrated and to this extent preferred, a base 9 of the piece goods cabinet 1 that is located under at least one of the piece goods modules 2 can be moved forward. At the same time or subsequently, then at least one piece goods module 2 arranged above the base 9 can also be moved out forward. For example, space is created as a result in order to displace at least individual ones of the remaining piece goods modules 2 in the piece goods cabinet 1. In principle, to displace the piece goods modules 2 in the piece goods cabinet 1, it is possible to dispense with a corresponding base 9, in any case a base 9 that is displaceable back and forth according to FIG. 1B. The base 9 can be useful, however, to assist reliable displacement of the piece goods modules 2 in the piece goods cabinet 1.

Figure 1C:
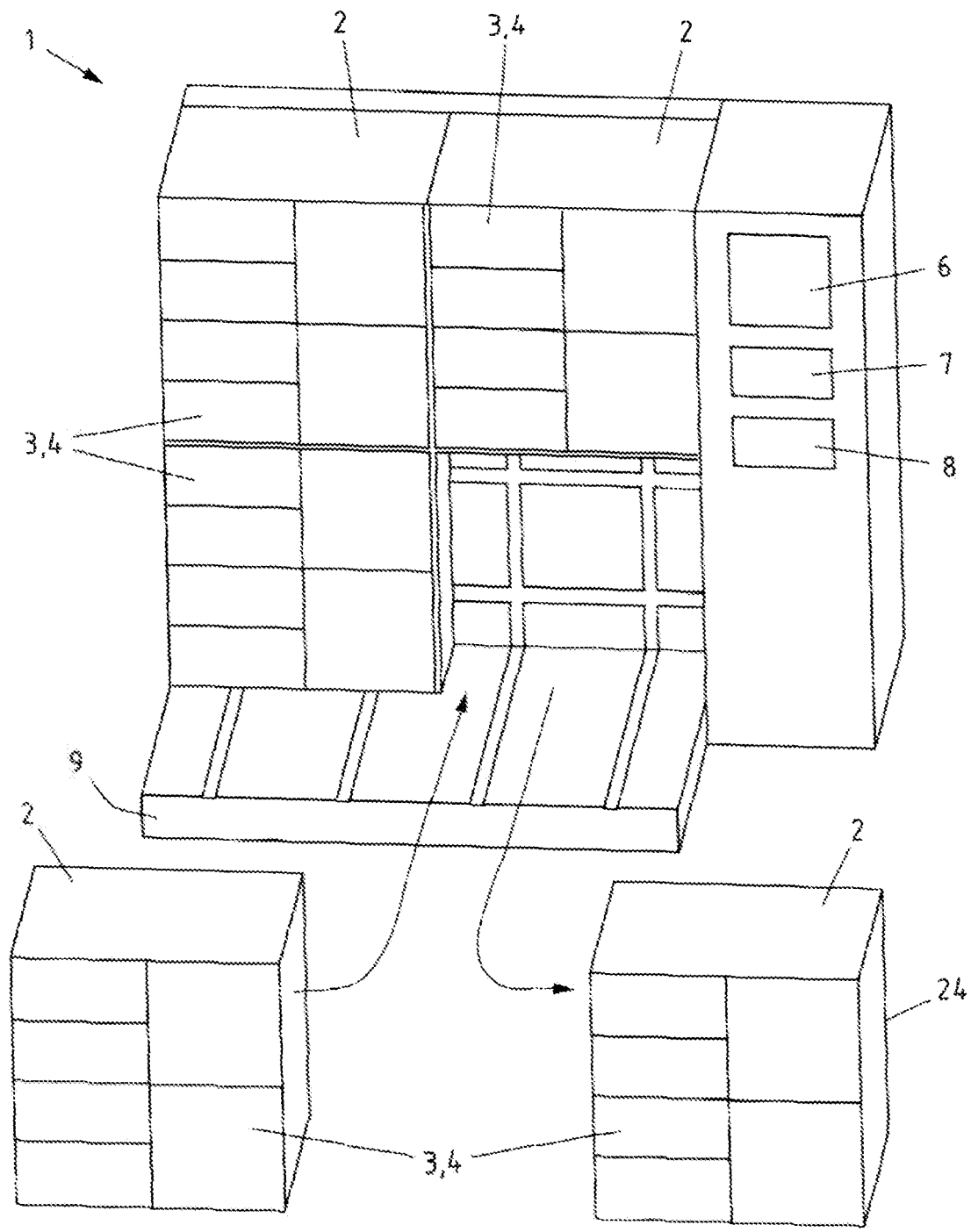
Figure 1D:
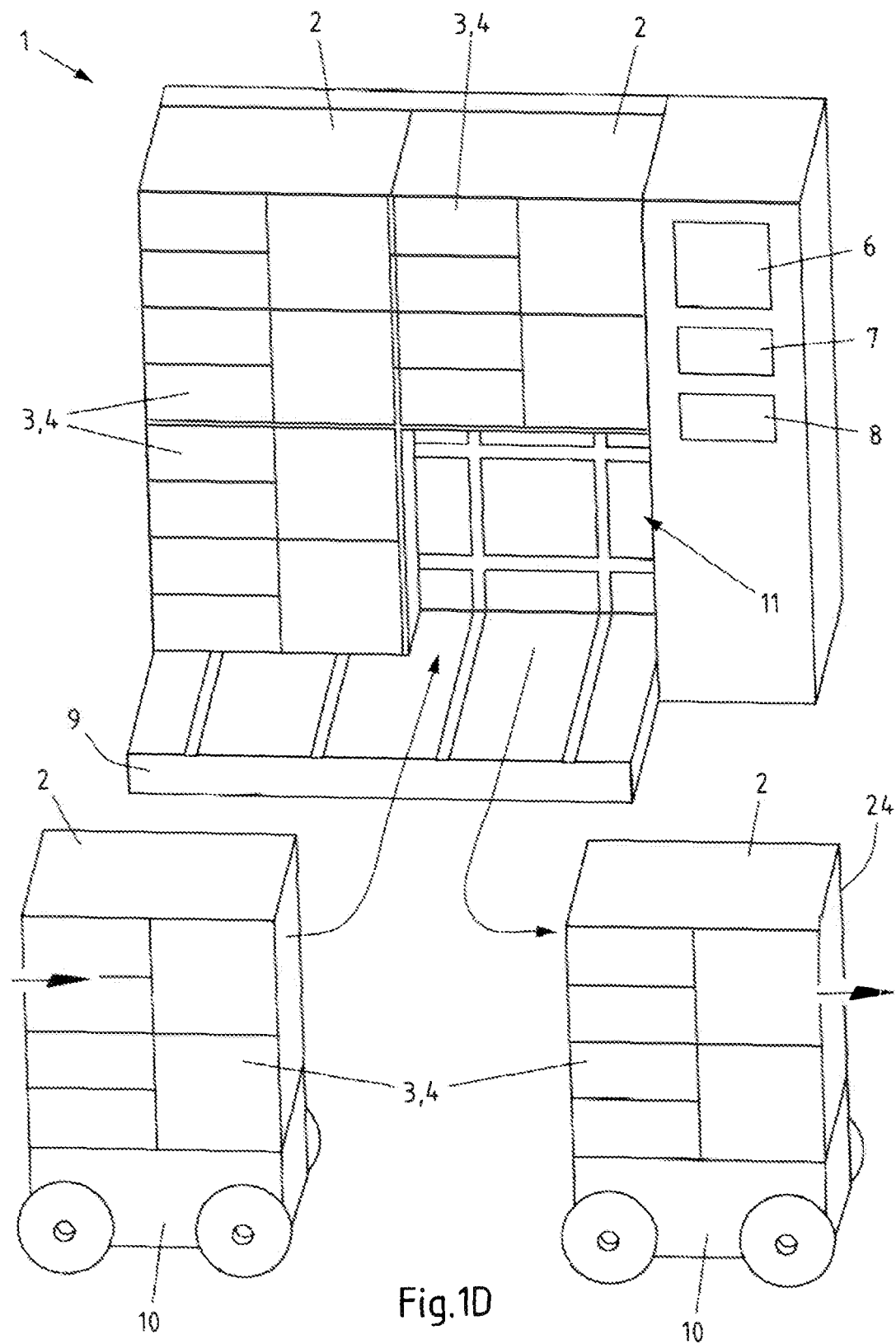

In the piece goods cabinet 1 that is illustrated and to this extent preferred, the piece goods modules 2 can not only be displaced but also replaced by other piece goods modules 2, as illustrated in FIG. 1C. It is expedient if the piece goods modules 2 are constructed identically with regard to their dimensions and their external configurations, if necessary also standardized. In the example illustrated, the piece goods module 2 is picked up by an autonomously driving vehicle 10 and transported away. Another piece goods module 2 is then supplied by the same or another autonomously driving vehicle 10 and transferred to the piece goods cabinet 1, as illustrated in FIG. 1D. If necessary, the base 9 of the piece goods cabinet 1 can be moved back again. This is preferably but not necessarily carried out together with the base 9.

Against this background, the piece goods cabinet 1 illustrated can be a package station. Then, for example, piece goods modules 2 having piece goods 5, for example in the form of packages or the like, in the piece goods compartments 3 can be delivered into the piece goods cabinet 1 via vehicles 10 and transferred to the piece goods cabinet 1 or accepted by the piece goods cabinet 1. The control module 7 additionally obtains information as to which piece good 5 is located in which piece goods compartment 3. A collector can then be authenticated via the operating module 6 and, by the control module 7, the closure unit 4 of the piece goods compartment 3 in which the piece good 5 for the collection of which the collector is authenticated is located. Alternatively or additionally, however, a person can also insert a piece good 5 which is intended for another person, in particular at a different location, into a piece goods compartment 3. Via the operating module 6 and the control module 7, the closure unit 4 of an empty piece goods compartment 3 is then displaced into the open position. The corresponding person then inserts the piece good 5 into the piece goods compartment 3. The closure unit 4 is then displaced into the closed position again.

If, for example, a piece goods module 2 has been emptied by the appropriate collector, the empty piece goods module 2 can be replaced by another piece goods module 2 populated with further piece goods 5 provided for collection at the corresponding location. If, alternatively or additionally, a piece goods module 2 is filled with newly inserted piece goods 5, said piece good module 2 can be released to a vehicle 10 and replaced by a piece goods module 2 that is empty or filled with piece goods 5 to be collected at the specific location. This can be carried out in the manner illustrated in FIGS. 1A-D. Autonomously driving vehicles 10 for transporting the piece goods modules 2 are provided. However, other vehicles 10 would likewise be conceivable.

Figure 2:
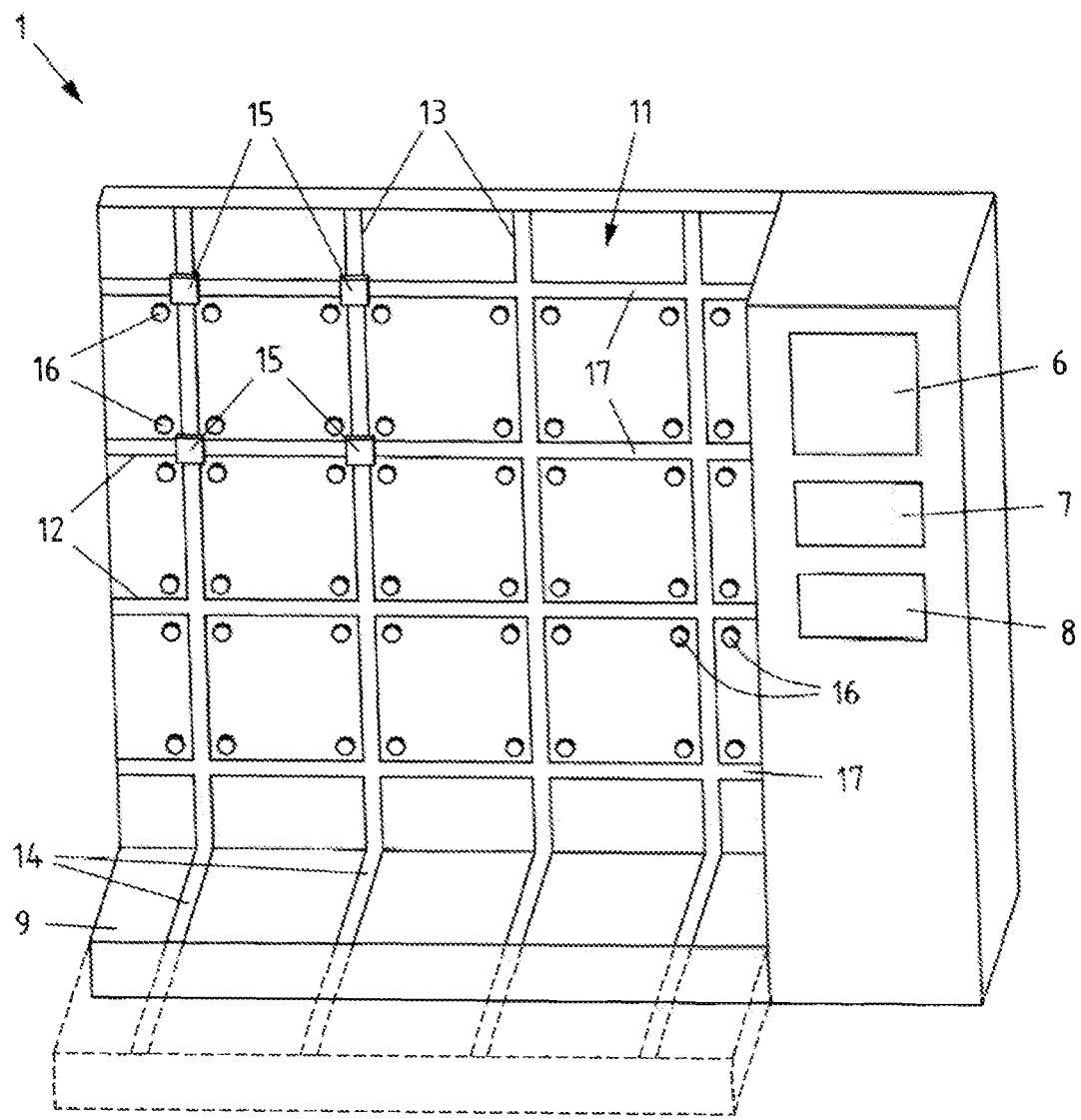
FIG. 2 shows a perspective view of the piece goods cabinet according to the invention from FIG. 1 with the piece goods modules removed.

In FIG. 2 the piece goods cabinet 1 is illustrated without the piece goods modules 2. The piece goods cabinet 1 that is illustrated and to this extent preferred has a rail system 11 for displacing the piece goods modules 2, which comprises both vertical and horizontal rail sections 12, 13, 14. The horizontal rail sections 12, 14 are partially oriented at right angles to one another. In addition, vertical rail sections 13 and horizontal rail sections 12 cross one another in some sections and partly. Held in the rail system 11 are mover units 15 which, in turn, can be connected to the piece goods modules 2. The connection of the piece goods modules 2 to the mover units 15 and the connection of the mover units 15 to the rail system 11 is such that the piece goods modules 2 can be held in position in the piece goods cabinet 1 by the mover units 15. As a result of moving the mover units 15 connected to piece goods modules 2, the corresponding piece goods modules 2 can be displaced in the piece goods cabinet 1. If the piece goods modules 2 are not intended to be displaced or moved in the piece goods cabinet 1, the mover units 15 can transfer the piece goods modules 2 to locking devices 16 provided in a stationary manner in the piece goods cabinet 1, which hold the piece good modules 2 in a stationary manner, in particular with a form fit, in the piece goods cabinet 1 even without the mover units 15. The locking devices 16 can be designed, for example, in the form of hooks.

If piece goods modules 2 are not held in the piece goods cabinet 1 by mover units 15, said mover units 15 can be detached from the corresponding piece goods modules 2 and moved along the rail system 11 without the piece goods modules 2. The mover units 15 can thus, for example, move to other piece goods modules 2 and there be connected to the other piece goods modules 2. Then, the corresponding other piece goods modules 2 can be displaced along the rail system 11 by the then connected mover units 15. For example, for the case in which none of the piece goods modules 2 is to be displaced or if individual mover units 15 are not needed, said mover units 15 can be moved into a parking area 17 of the rail system 11. There, the mover units 15 wait to be used again for displacing piece goods modules 2. The piece goods modules 2 and the mover units 15 of a piece goods cabinet 1 are connectable and re-detachable here in different combinations.

Figure 3A:
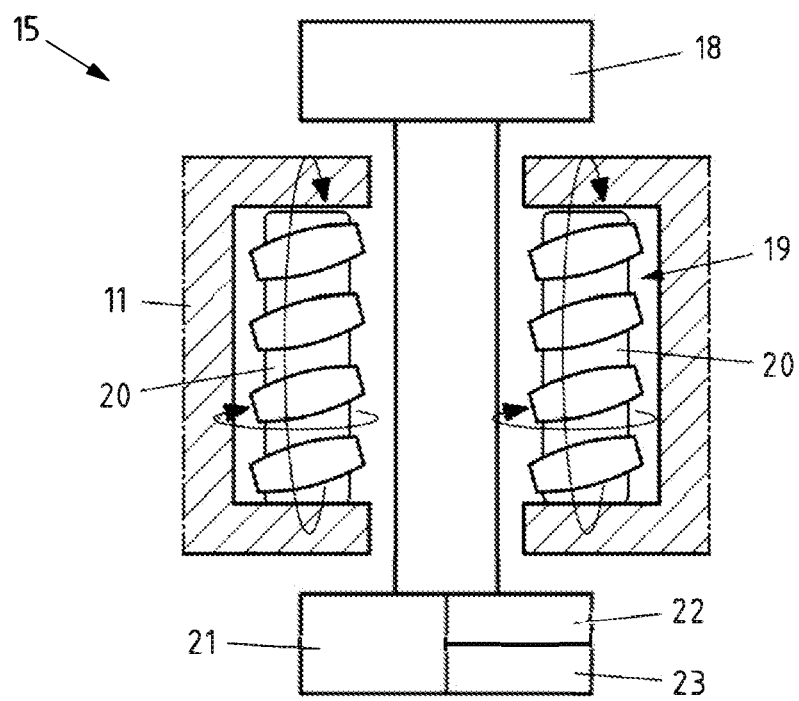
FIGS. 3A-B show alternative details of the piece goods cabinet from FIG. 2 with a mover unit that can be moved along a rail system in a sectional view.
Figure 3B:
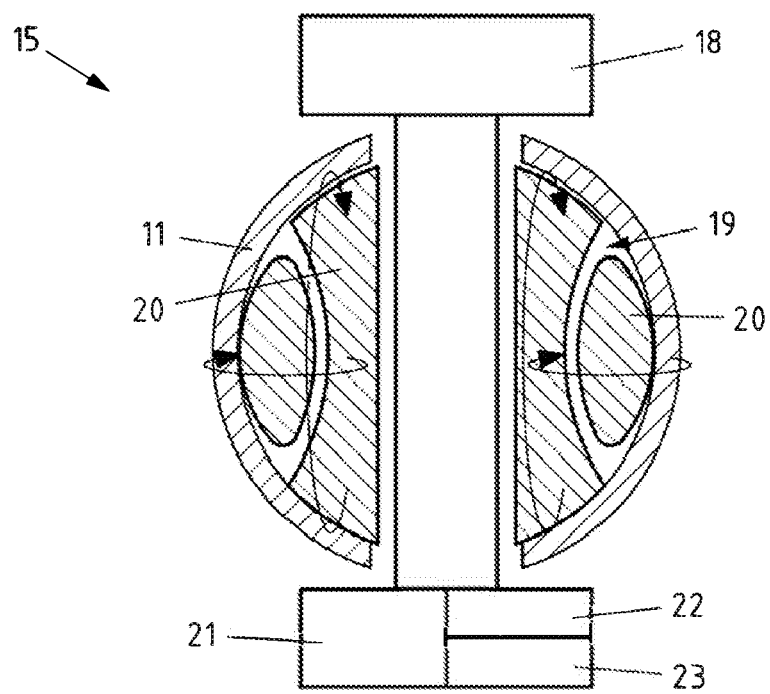

In FIGS. 3A-B alternative mover units 15 guided on the rail system 11 are illustrated schematically. Common to both mover units 15 are connection units 18 for the detachable connection of the mover units 15 to piece goods modules 2 of the piece goods cabinet 1. The connection units 18 can be designed here to engage in a receptacle in the piece goods modules 2 if necessary and to be withdrawn from the receptacles of the piece goods modules 2 again. Alternatively, the mover units 15 can comprise threaded rods, which can be screwed into mating threads in the piece goods modules 2. The threaded rods can then be unscrewed out of the mating threads again. However, it is also conceivable that, as an alternative or in addition to a form-fitting connection, a magnetic, in particular electromagnetic, connection can be established between mover units 15 and piece goods modules 2.

Besides the connection unit 18, the mover units 15 also have movement units 19 which, in the mover units 15 that are illustrated and to this extent preferred, are received in the rail system 11. The movement units 19 can be designed depending on how the rail system 11 is designed. In the case of a rectangular cross section of the rail sections 12-14, different drive wheels 20 can be used than in the case of rail sections 12-14 having a circular cross section. The drive wheels 20 roll on the rail system 11 to drive the mover unit 15 and thus displace the mover unit 15 along the rail system 11. In the mover units 15 that are illustrated and to this extent preferred, omnidirectional drive wheels 20 are provided to be able to move the mover units 15 in the rail system 11 in different directions and therefore to be able easily to change or travel to and fro between differently oriented rail sections 12-14. The corresponding directions of rotation of the omnidirectional drive wheels 20 are illustrated by means of appropriate arrows.

The movement unit 19 is driven by a drive unit 21 to move the mover units 15 along the rail system 11. The drive unit 21 can comprise a storage battery which, if necessary, can be charged inductively, for example in a parking area 17 of the rail system 11. If necessary, however, the mover units 15 are also supplied directly with power via the rail system 11.

The movement of the mover units 15 is controlled via a control unit 22. The control unit 22 determines whether the mover unit 15 is moved along the rail system 11 and in which direction this is carried out. In addition, the speed at which this is intended to be carried out can also be predetermined. Since the control of the mover units 15 depends on external conditions and the displacement of piece goods modules 2 requires a synchronous movement of multiple mover units 15, for example, the mover units 15 that are illustrated and to this extent preferred also have communications units 23. Via said communications units 23, the control units 22 can obtain the stipulation to drive the mover units 15. Via the communications unit 23, the mover units 15 can also arrange for other mover units 15 to move along the rail system 11 if necessary, specifically in particular in a mutually coordinated manner or synchronized. Ultimately, to control the piece goods cabinet 1 it is intrinsically conceivable that the communications units 23 of the mover units 15 communicate with communications units 23 of other mover units 15 and/or with a control module 7 of the piece goods cabinet 1 and/or with a control unit 24 of at least one piece goods module 2. In particular, the control module 7 of the piece goods cabinet 1 can communicate with other devices outside the piece goods cabinet 1, for example to coordinate the replacement of piece goods modules 2 of the piece goods cabinet 1 by other piece goods modules 2.

Figure 4A:
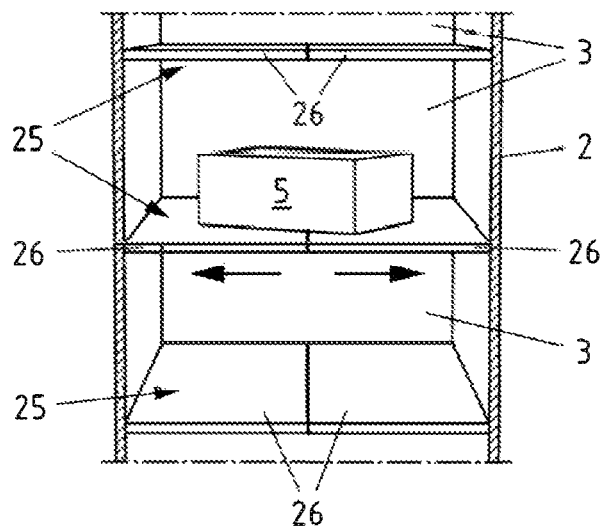
FIGS. 4A-C show a schematic plan view of two piece goods compartments of a piece goods module of the piece goods cabinet from FIG. 1 that are arranged above one another.
Figure 4B:
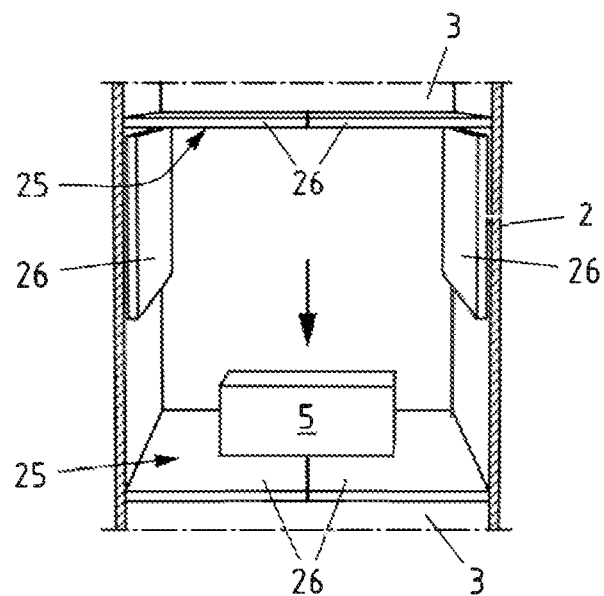
Figure 4C:
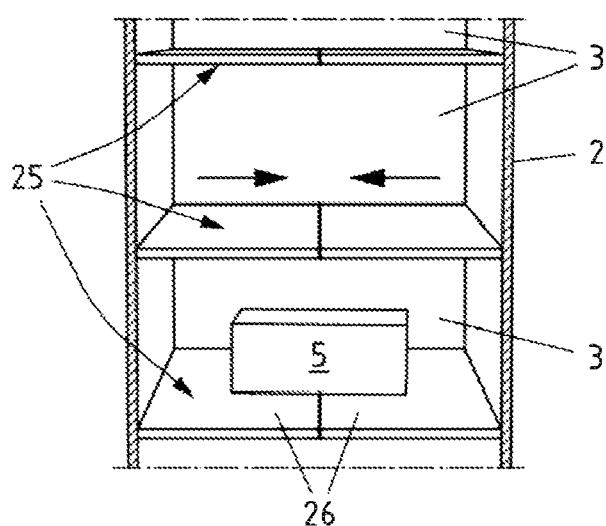

In FIGS. 4A-C, two piece goods compartments 3 of a piece goods module 2 of the piece goods cabinet 1 from FIG. 1 that are arranged above one another are illustrated in different positions. Analogously, these can also be piece goods compartments 3 that are arranged above one of two piece goods modules 2 that are arranged above one another. If necessary, the function of the piece goods compartments 3 would then be analogous. Of the two piece goods compartments 3 illustrated in FIG. 4A, a piece good 5 which lies on the floor 25 of the piece goods compartment 3 is provided in the upper piece goods compartment 3. If necessary under the control of the control module 7 of the piece goods cabinet 1, the floor 25 of the upper piece goods compartment 3 can be opened, the floor 25 being displaced from a holding position for holding the piece good 5 in the piece goods compartment 3 in a forwarding position for forwarding the piece good 5 into the piece goods compartment 3 lying underneath. For this purpose, the floor 25 is formed by two floor segments 26, which can pivot downward away from each other. Consequently, the piece good 5 is forwarded from the upper piece goods compartment 3 to the lower piece goods compartment 3, as illustrated in FIG. 4B.

Then, the floor 25 can be closed again by the floor segments 26 being pivoted upward again, as illustrated in FIG. 4C. If necessary, the piece good 5 can then be forwarded down in the same way to a further piece goods compartment 3 of the same piece goods module 2 or another piece goods module 2 arranged underneath. The corresponding floors 25 of the piece goods compartments 3 do not have to have two floor segments 26. The floors can also be designed, at least partly, as sliders, with flaps or in another way to provide the corresponding function of the forwarding of the piece goods 5 downward.

LIST OF DESIGNATIONS

1. Piece goods cabinet
2. Piece goods module
3. Piece goods compartment
4. Closure unit
5. Piece good
6. Operating module
7. Control module
8. Communications module
9. Base
10. Vehicle
11. Rail system
12. Horizontal rail section
13. Vertical rail section
14. Horizontal rail section
15. Mover unit
16. Locking device
17. Parking area
18. Connection unit
19. Movement unit
20. Drive wheel
21. Drive unit
22. Control unit
23. Communications unit
24. Control unit
25. Floor
26. Floor segment All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A piece goods cabinet comprising:
a plurality of piece goods modules, wherein each piece goods module has a plurality of piece goods compartments,
wherein each piece goods compartment is assigned a closure unit which is displaceable from a closed position closing the respective piece goods compartment, preventing removal of a piece good from the piece goods compartment into an open position opening the piece goods compartment for the removal and/or insertion of a piece good and back again,
wherein at least individual piece goods modules within the piece goods cabinet are arranged such that they can be displaced between at least two module positions, at least substantially in the vertical direction and/or at least substantially in at least one horizontal direction,
wherein at least individual displaceable piece goods modules are connected to mover units of the piece goods cabinet, which are designed to displace the piece goods modules in the piece goods cabinet.

2. The piece goods cabinet according to claim 1, wherein the mover units can be connected detachably and re-connectably to the individual piece goods modules, and wherein the individual piece goods modules can preferably be replaced by identical piece goods modules.

3. The piece goods cabinet according to claim 1, further comprising a rail system for the guided displacement of the at least individual piece goods modules, and wherein the mover units are preferably guided on the rail system.

4. The piece goods cabinet according to claim 3, wherein the rail system has at least substantially vertical rail sections and at least substantially horizontal rail sections, and wherein the vertical rail sections and the horizontal rail sections at least partly cross one another.

5. The piece goods cabinet according to claim 3, wherein the rail system has horizontal rail sections extending at least substantially at right angles to one another for the guided displacement of the at least individual piece goods modules.

6. The piece goods cabinet according to claim 3, wherein the mover units are arranged to be movable automatically along the rail system, and wherein, preferably, at least a plurality of mover units can be moved synchronously along the rail system and/or at least individual mover units can be moved independently of one another along the rail system.

7. The piece goods cabinet according to claim 3, wherein the rail system has at least one parking area for currently unused mover units.

8. The piece goods cabinet according to claim 1, wherein the mover units have a connection unit for detachable connection to at least one piece goods module, a movement unit for moving the mover units along the rail system, a drive unit for driving the movement unit, a control unit for controlling the mover units and/or a communications unit for communication between the mover units and a control module of the piece goods cabinet, a control unit of the piece goods module and/or control units of further mover units.

9. The piece goods cabinet according to in claim 8, wherein the movement unit for driving the mover units has a rotor for moving along a stator of a linear motor assigned to the rail system, and/or at least one drive wheel for rolling along the rail system, and wherein, preferably, the at least one drive wheel is designed as an omnidirectional wheel.

10. The piece goods cabinet according to claim 1, wherein locking devices for the stationary locking of piece goods modules in predetermined positions in the piece goods cabinet are provided, and wherein, preferably, the mover units are designed to be detachable from the piece goods modules that are locked in a stationary manner by the locking devices and to be re-connectable.

11. The piece goods cabinet according to claim 1, wherein the piece goods compartments are each assigned a floor for holding a piece good in the respective piece goods compartment, and wherein at least individual floors are provided to be displaceable between a holding position for holding a piece good in a forwarding position for forwarding the piece good into the piece goods compartment located underneath.

12. The method for operating a piece goods cabinet according to claim 1, comprising:
opening the closure unit of at least one piece goods compartment of a piece goods module,
removing a piece good from the open piece goods compartment or inserting a piece good into the open piece goods compartment,
closing the closure unit of the at least one piece goods compartment after the insertion, and
after the closure of the piece goods compartment, moving at least individual piece goods modules by means of the mover units connected to the appropriate piece goods modules within the piece goods cabinet between at least two module positions in an at least substantially vertical and/or in an at least substantially horizontal direction in the piece goods cabinet.

13. The method according to claim 12,
wherein individual mover units are connected to the individual piece goods modules and separated again, and
wherein, preferably, the individual piece goods modules are replaced, in particular without mover units.

14. The method according to claim 12,
wherein at least the individual mover units for displacing the individual piece goods modules are displaced along a rail system and are guided on the rail system, and
wherein, preferably, the mover units are displaced and guided on vertical rail sections and horizontal rail sections, in particular crossing the vertical rail sections.

15. The method according to claim 12, further comprising moving the mover units automatically, preferably at least partly synchronously and/or at least partially independently of one another along the rail system, and
preferably, displacing unused mover units into a parking area of the rail system.

16. The method according to claim 12,
wherein at least individual mover units are detachably connected to at least one piece goods module by connection units of the mover units, are moved along the rail system via movement units of the mover units, are driven to move via drive units of the mover units, are controlled to move via control units of the mover units and/or communicate via communications units of the mover units with a control module of the piece goods cabinet, a control unit of the piece goods modules and/or control units of further mover units.

17. The method according to claim 16,
wherein the mover units are moved by means of a rotor along the stator of a linear motor assigned to the rail system, and/or
wherein the mover units are moved along the rail system by at least one drive wheel rolling along the rail system and preferably designed as an omnidirectional wheel.

18. The method according to claim 12,
wherein individual piece goods modules are transferred from the individual mover units to locking devices and are held in a stationary manner in the piece goods cabinet by the locking devices and/or
wherein individual piece goods modules are picked up by the individual mover units from locking devices of the piece goods cabinet and then moved into the piece goods cabinet.

19. The method according to claim 12,
wherein at least one piece good is forwarded by at least one openable floor of at least one piece goods compartment into a piece goods compartment located underneath, and
wherein, preferably, a floor of at least one piece goods compartment is opened between a holding position for holding a piece good in a forwarding position for forwarding the piece good into the piece goods compartment located underneath and, in particular, is closed again.

* * * * *

UNITED STATES PATENT AND TRADEMARK OFFICE
CERTIFICATE OF CORRECTION

| | |
|---|---|
| PATENT NO. | : 11,434,078 B2 |
| APPLICATION NO. | : 17/096486 |
| DATED | : September 6, 2022 |
| INVENTOR(S) | : Uwe Radetzki |

It is certified that error appears in the above-identified patent and that said Letters Patent is hereby corrected as shown below:

In the Claims

Claim 12, Line 1 reads "The method for operating a piece goods cabinet" and should read --A method for operating a piece goods cabinet--

Signed and Sealed this
Eighth Day of November, 2022

*Katherine Kelly Vidal*

Katherine Kelly Vidal
*Director of the United States Patent and Trademark Office*